United States Patent [19]
Linsbauer et al.

[11] Patent Number: 5,582,146
[45] Date of Patent: Dec. 10, 1996

[54] SUCTION AIR FILTER

[75] Inventors: Peter Linsbauer, Remshalden; Karl-Heinz Klöpfer, Winnenden, both of Germany

[73] Assignee: Andreas Stihl, Waiblingen, Germany

[21] Appl. No.: 511,713

[22] Filed: Aug. 4, 1995

[30]     Foreign Application Priority Data

Aug. 5, 1994 [DE] Germany .......................... 44 27 739.3

[51] Int. Cl.$^6$ .................................................. F02B 77/00
[52] U.S. Cl. .......................... 123/198 E; 55/485; 55/486; 55/DIG. 28
[58] Field of Search .......................... 123/198 E; 55/485, 55/486, 487, DIG. 28

[56]              References Cited

U.S. PATENT DOCUMENTS

| | | | |
|---|---|---|---|
| 2,198,189 | 4/1940 | Vokes | 55/485 |
| 2,822,059 | 2/1958 | Lunn et al. | 55/487 |
| 5,073,307 | 12/1991 | Langer et al. | 261/35 |
| 5,377,632 | 1/1995 | Aronsson et al. | 123/198 E |

*Primary Examiner*—Noah P. Kamen
*Attorney, Agent, or Firm*—Robert W. Becker & Associates

[57]              ABSTRACT

A suction air filter for an internal combustion engine of a hand-held working tool has a housing having an inlet opening for air sucked in and an outlet opening for the clean air exiting the suction air filter and supplied as combustion air to a suction channel of the internal combustion engine. The housing includes a plurality of filter chambers arranged in series one after another in a direction of air flow from the inlet opening to the outlet opening. Each one of the filter chambers has at least one filter body positioned therein through which filter body the air flows.

17 Claims, 5 Drawing Sheets

SUCTION AIR FILTER

BACKGROUND OF THE INVENTION

The present invention relates to a suction air filter for internal combustion engines of a hand-operated working tool like a cut-off tool or the like with a housing being provided with an inlet opening for intake air and an outlet opening for clean air which is supplied as combustion air to the suction channel of the internal combustion engine and being provided within the housing with a filter body between the inlet opening and the outlet opening.

Such a suction air filter for a hand-operated working tool is known from U.S. Pat. No. 5,073,307. A carburetor sucks clean air into a suction channel for producing the fuel/air mixture whereby the supplied air is cleaned from dirt particles of the intake air in an air filter located upstream of the carburetor. The filter body of the air filter is constructed as a ring filter. The intake air enters the filter from the outer mantle surface. Dirt particles are filtered by the filter from the contaminated intake air. A radially inwardly directed air flow is created because of the pressure difference between outer and inner side of the ring filter. The cleaned air within the interior space of the ring filter is supplied to the suction channel of the carburetor via an outlet opening of the air filter. Such a ring filter must provide a high filter action, particularly if installed in working tools like cut-off tools, in order to be able to effectively filter the dirt particles, which are created during operation of the working tool, from the intake air and thus to prevent a contamination of the carburetor and an increased wear of the internal combustion engine. The application of very fine-pored filters, however, only provides a very short service life due to the rapid clogging of the filter pores since the filter action decreases considerably and, moreover, the pressure within the suction channel decreases considerably so that a loss of performance is to be expected.

On the other hand, the application of large-pored filters carries the risk that fine and finest dirt particles pass through the ring filter unimpededly and deposit within the interior of the carburetor and of the combustion engine, possibly leading to permanent damage.

Moreover, when removing the air filter for maintenance and cleaning purposes, there is a risk that small and large dirt particles can enter the exposed suction channel of the carburetor.

It is, therefore, an object of the invention to keep the pressure drop within the air filter as low as possible during a longer service life of the working tool and to increase the service life of the air filter.

SUMMARY OF THE INVENTION

A suction air filter for an internal combustion engine of a hand-held working tool according to the present invention is primarily characterized by:
  a housing having an inlet opening for air sucked in and an outlet opening for the clean air exiting the suction air filter and supplied as combustion air to a suction channel of the internal combustion engine;
  the housing comprising a plurality of filter chambers arranged in series one after another in a direction of air flow from the inlet opening to the outlet opening; and
  wherein each one of the filter chambers has at least one filter body positioned therein through which filter body the air flows.

Preferably, the housing has a first, a second, and a third one of the filter chamber in the direction of air flow, wherein the filter body of the first filter chambers is a prefilter, the filter body of the second filter chamber is a main filter, and the filter body of the third filter chamber is a fine filter.

An upstream side of one of the filter bodies is preferably positioned substantially in a plane defined by the vector of the gravitational force and a line extending perpendicular to the direction of air flow.

The filter chambers are connected to one another to as to be sealed against introduction of external air.

The filter chambers are detachably connected to one another.

The housing expediently comprises a housing cover and the first filter chamber is delimited by the housing cover and a housing wall of the second filter chamber.

Advantageously, the housing wall of the second filter chamber has a plurality of air-flow openings.

The air-flow openings are expediently distributed uniformly over the entire surface area of the housing wall.

Preferably, the housing wall of the second filter chamber has a circumferential sealing groove. The housing cover has a partition for delimiting the first filter chamber. The circumferential groove receives an edge of the partition.

The second filter chamber preferably comprises a cup-shaped chamber housing with an inner circumferential shoulder at which the filter body of the second filter chamber is supported in an air-tight manner.

In a preferred embodiments of the present invention, the filter body of the second filter chamber comprises a sealing member made of a foamed plastic material, the sealing member resting air-tightly on the shoulder. The sealing member is preferably made of polyurethane.

Advantageously, the third filter chamber is comprised of a cup-shaped end housing with a circumferential support edge for receiving the filter body of the third filter chamber. The cup-shaped end housing is provided with the outlet opening.

Advantageously, the filter body of the third filter chamber comprises a circumferential U-shaped sealing rim that engages the support edge in an air-tight manner.

The filter body of the third filter chamber comprises a rebound container for rebounding fuel particles, arranged at a side of the filter body of the third filter chamber facing the outlet opening so as to be positioned opposite the outlet opening.

The sealing rim is preferably sealingly engaged by the sealing member of the filter body of the second filter chamber.

The cup-shaped end housing expediently has a sealing surface facing the second filter chamber and wherein the sealing member rests sealingly on the sealing surface.

In yet another embodiment of the present invention, the cup-shaped chamber housing comprises fastening means for fastening the cup-shaped chamber housing to the cup-shaped end housing, wherein the fastening means are accessible only after removing the housing cover.

The housing cover has a air suction channel for guiding the air sucked in to the first filter chamber, the air suction channel having rebound walls for separating coarse dirt particles from the air flow.

The inlet opening is located, when viewing the housing cover in an end view, within the area enclosed by the periphery of the housing cover.

By means of the serial arrangement of several filter chambers each provided with a filter body, the cleaning of the air is carried out stepwise with the degree of cleanness of the air increasing from filtering step to filtering step. By providing separate filter chambers, depositing spaces for dust are provided into which dirt particles which become loose by vibration can fall due to their own weight. Thus, it is ensured that the filter bodies clog less rapidly even at a longer service life of the working tool. Moreover, the contamination level of the filter bodies decreases more and more from one filtering step to the next so that when maintenance work is done, first the filters at the dirt side have to be cleaned whereas the filters at the clean air side have to be cleaned at considerably larger time intervals because of their considerably lower contamination level. Moreover, because of the stepwise maintenance of the filters located remote from the carburetor, a protection for the suction channel of the carburetor is given during cleaning, as long as the last filter abutting the suction channel is not removed.

Moreover, during the maintenance work the maintenance person has a visual control of the contamination level of the respective filter to be serviced and thus can determine whether the cleaning, respectively, the exchange of the subsequent adjacent filter and the extra work required therefor is necessary at all.

In a preferred embodiment filtering is carried out via three filter bodies arranged in a serial arrangement, a prefilter, a main filter and a fine filter. The prefilter is expediently located in a housing cover which can be easily removed and which is provided with air suction channels for supplying the intake air. The air suction channels are advantageously arranged angularly relative to the air flow direction of the air flowing through the air filter. The intake air after having passed through the air suction channels is advantageously deflected in the direction of the prefilter by rebound walls provided within the filter chamber of the prefilter. Thus, large dirt particles lose their kinetic energy and fall into the depositing spaces of the filter chamber due to their own weight without clogging the filter body of the prefilter. Large dirt particles which have collected on the upstream side of the filter body fall down in the same manner; this process is encouraged by the fact that the upstream side of the filter body is located in a plane which is defined by the vector of the gravitational force and a line perpendicular relative to the air flow direction so that the upstream side of the filter body is positioned approximately vertically when the working tool is not operated. Large dirt particles can therefore fall down unimpededly.

For preventing air leaks, i.e., unwanted external air streams entering the filter chambers, the filter chambers are connected to one another air-tightly, advantageously detachably. Thus, a clearly defined air-flow direction is created from the outer filter chamber located at the dirt side (upstream side) to the inner filter chamber located at the clean air side (downstream side) of the suction air filter.

BRIEF DESCRIPTION OF THE DRAWINGS

The objects and advantages of the present invention will appear more clearly from the following specification in conjunction with the accompanying schematic drawings, in which.

DESCRIPTION OF PREFERRED EMBODIMENTS

Figure 1:
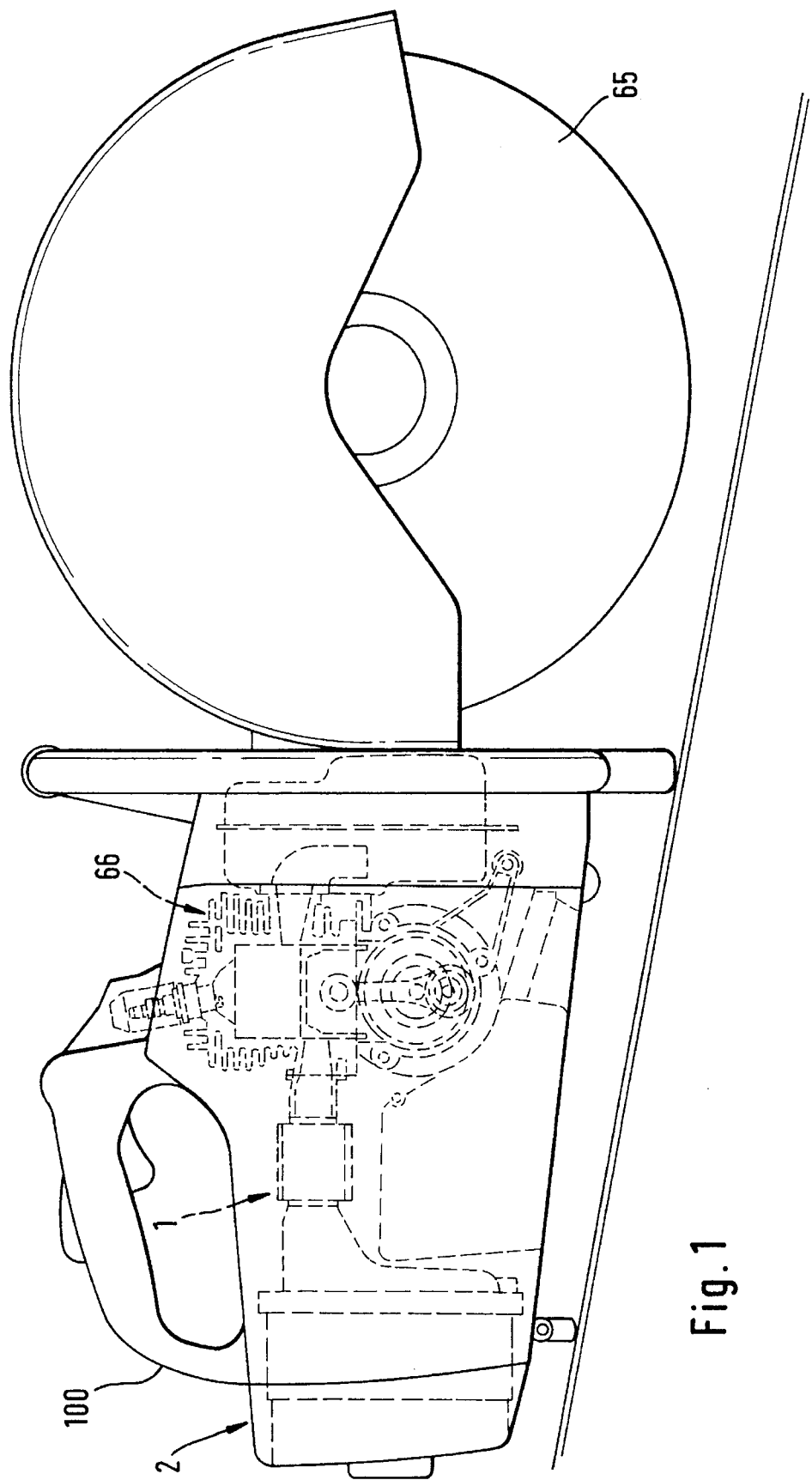
FIG. 1 illustrates a schematic side view of a cut-off tool with an inventive suction air filter.

FIG. 1 illustrates a side view of a cut-off tool. The cutting wheel 65 is driven by an internal combustion engine 66, for example, a two-stroke engine. The ignitable fuel/air mixture is supplied to the engine 66 by the carburetor 1, for example a diaphragm carburetor that sucks in clean air 10 by means of its suction channel 7, see FIG. 2. The clean air 10 is being filtered within the air filter 2 that is attached to the diaphragm carburetor 1 and that comprises, in the illustrated embodiment, three filter segments 11, 12, and 13 in a staggered (serial) arrangement within housing 3. When the combustion engine is in operation, intake air 8 flows into the air filter 2 via inlet openings 5 and air suction channels 31, due to the creation of underpressure within the suction channel 7 of the diaphragm carburetor. The intake air 8 successively flows through the filter bodies 11, 12, and 13, and the degree of cleanness of the intake air increases from filtering step to filtering step. After passing through the third filter body 18, the intake air is sufficiently clean and flows into the suction channel 7 as clean air 10 via an outlet opening 6 in order to be mixed with fuel to produce a fuel/air mixture in a manner known per se.

According to the invention, the air filter comprises filter segments each having a filter body arranged in a separate filter chamber. The filter segment operate completely independently from one another, in case of a failure of one filter segment, the intake air is being cleaned by the filter action of the filter segment arranged upstream or downstream thereof.

Figure 2:
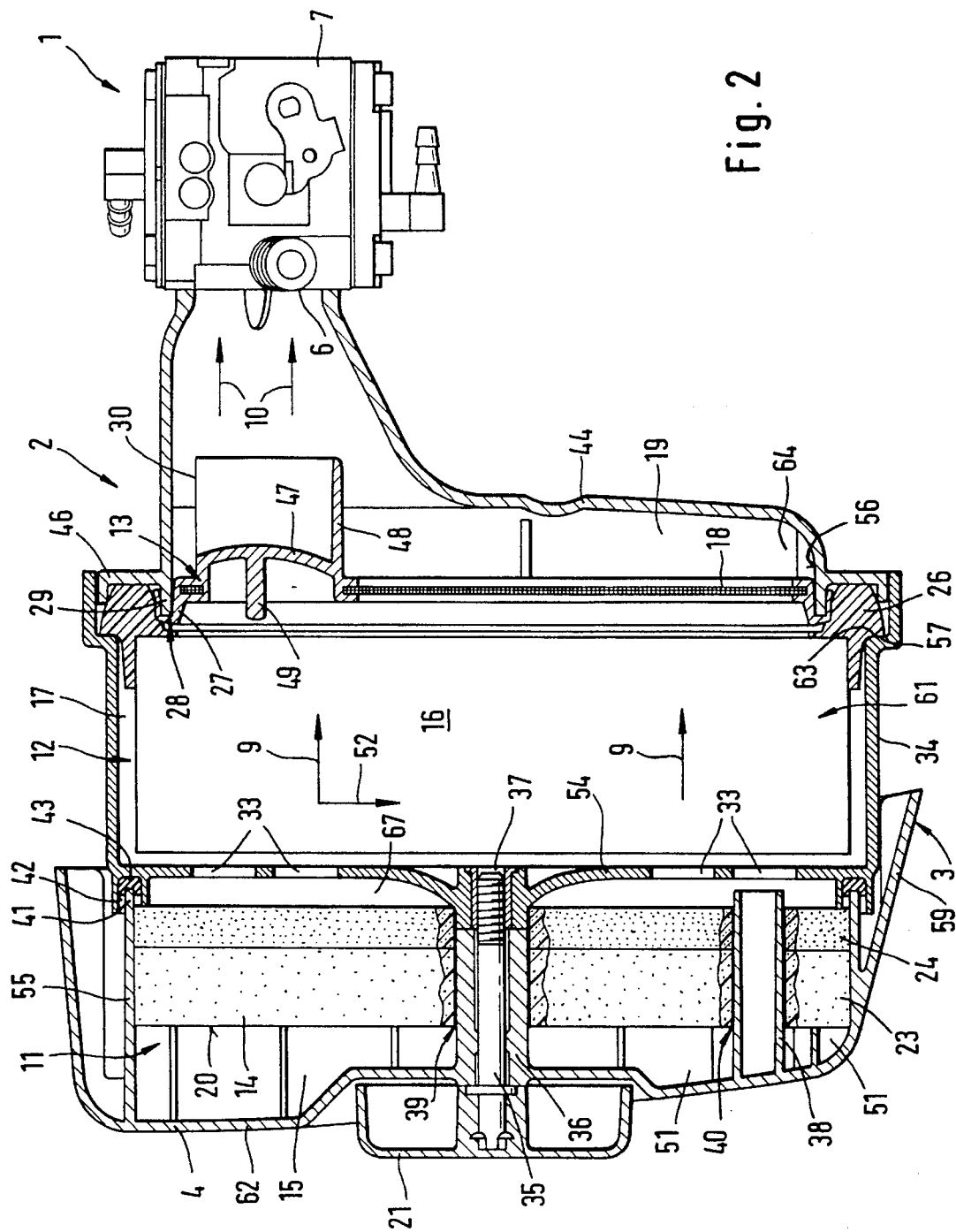
FIG. 2 illustrates a cross-sectional side view of the air filter arranged at the carburetor and provided with prefilter, main filter and fine filter, arranged in series.
Figure 3:
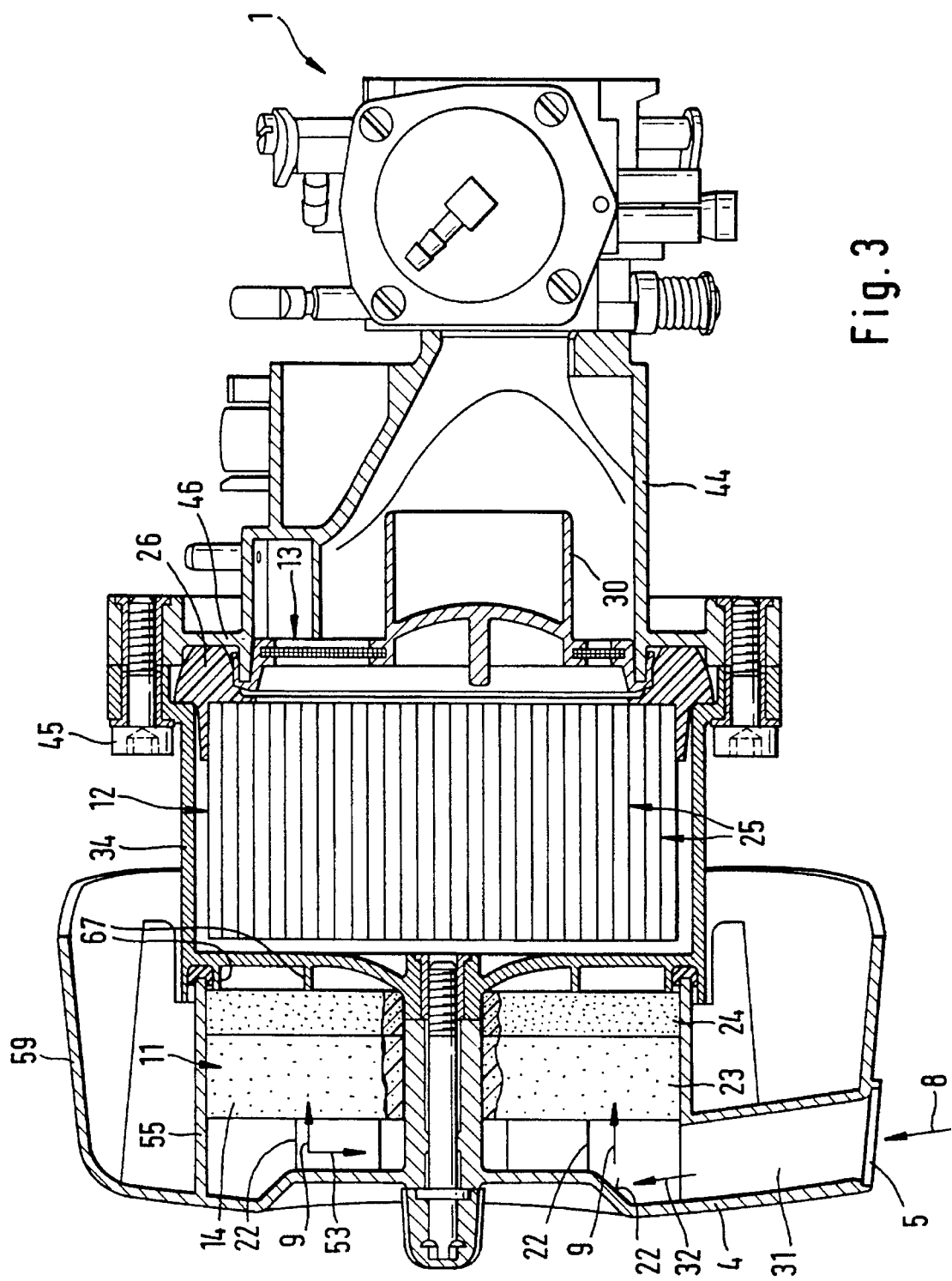
FIG. 3 a plan view in cross-section of the illustration according to FIG. 2.

In the embodiment according to FIGS. 2 and 3, the three filter segments are in the form of the prefilter 11, main filter 12, and fine filter 13, with the filter action increasing from filter segment to filter segment. Each of the three filter segments has its own filter chamber 15, 17 and 19 into which a respective filter body 14, 16, 18 is inserted.

The filter chamber 15 is laterally delimited by a wall 55 of the housing cover 4. This wall 55 is located within the interior space created by the outer wall 59 and is formed as a unitary part thereof. In the air-flow direction, the filter chamber 15 is deliminted at one side by the back wall 62 of the housing cover 4 and at the other side by a housing wall 54 of the adjacent filter chamber 17 of the main filter 12. The filter body 14 of the prefilter 11 is arranged within the filter chamber 15 in the interior space of the housing cover 4 and advantageously consists of a porous foamed material which can, according to FIGS. 2 and 3, be designed of two layers 23 and 24 of different porosity with the layer 23 located upstream, viewed in the air flow direction, being of a coarser porosity than the successive layer 24. The filter body 14 can expediently also be designed of a single layer or of more than two layers.

The contaminated intake air 8 flowing into the housing cover 4 through the inlet opening 5 and the air suction channel 31 passes through the filter body 14 of the prefilter 11 due to the pressure difference between the intake air side and the clean air side of the air filter 2; during this process, large dirt particles fall down due to their own weight at the upstream side 20 of the filter body 14 and collect at the dirt side of the filter chamber 15. In order to encourage this effect, the upstream side 20 of the filter body 14 is embodied as a planar, vertically extending surface which is defined by the vector at the gravitational force 52 and any line 53 perpendicular relative to the air flow direction 9, FIGS. 2 and 3. Accordingly, the upstream side 20 is positioned approximately perpendicularly relative to a horizontal base surface across which the tool is moved during operation, and large dirt particles can fall straight down.

In a further expedient embodiment it is provided that the intake air 8 flowing into the housing cover 4 enters the prefilter 11 angularly relative to the air flow direction 9. As can be seen in FIG. 3, the air suction channel 31 with its inlet opening 5 is located laterally at the housing cover 4 at an angle of approximately 100° relative to the air flow direction 9, preferably in the upper lateral area in order to prevent sprayed water from possibly entering the air suction channel. The intake air 8 drawn in through the air suction channel 31 hits rebound walls 22 which are designed such that the incoming air is deflected toward the air flow direction 9. It thus hits the upstream side 20 of the prefilter 11 perpendicularly. Large dirt particles carried by the intake air 8 lose their kinetic energy by hitting the rebound walls 22 and precipitate from the air flow into depositing spaces 51 within the prefilter chamber 15 from which collected dirt can be easily removed during cleaning. The depositing spaces 51 are located between the rear wall 62 of the housing cover 4 and the upstream side 20 of the filter body 14 of the prefilter 11. The depositing spaces 51 are separated from one another by laterally projecting, horizontally and vertically extending stays 58 which are formed as one piece with the exterior wall of the housing cover. The free end faces of the stays 58 support the filter body 14. At the side facing the main filter 12, the filter body 14 rests on supporting stays 67 which are provided at the housing wall 54 and extend in the vertical direction.

Advantageously, the housing cover 4 is removably attached to the chamber housing 34 of the main filter 12 by means of a wing screw 21. The threaded bolt 35 of the wing screw 21 protrudes through a bushing 36 which is formed as one piece with the housing cover 4 and extends over most of the depth of the housing cover 4 from the rear wall 62 of the housing cover 4 to the adjacent chamber housing 34 of the main filter 12. In the housing wall 54, facing the prefilter 11, of the chamber casing 34 a receiving portion 37 is provided into which a threaded part can be screwed or a nut can be inserted for receiving the threaded bolt 35 of the wing screw 21. Thus, the housing cover 4 can be unscrewed by hand without applying tools, which allows a fast visual control and an easy manipulation for cleaning and maintenance of the air filter.

The bushing 36 protrudes through the filter body 14 of the prefilter 11 and in conjunction with a second bushing 38, also connected to the housing cover 4 as a unitary part and advantageously located away from the vertical and horizontal center planes, provides a clear definition of the fitting position of the filter body 14. Therefore, the filter body 14 which must be provided with two corresponding bores or openings 39 and 40 can only be inserted into the filter chamber 15 in the exactly defined position. This precludes that the filter body is inserted in a wrong position.

The housing cover 4 is connected air-tightly to the chamber housing 34 of the main filter 12. For this purpose, an edge 41 of the partition 55 of the filter chamber 15 is formed as one piece with the housing cover 4 and engages a circumferential groove 42 of the chamber housing 34 of the main filter 12. A rubber gasket 43 is inserted into the circumferential groove 42. After the housing cover 4 is screwed onto the chamber housing 34 by means of the wing screw 21, the filter chambers 15 and 17 of the prefilter 11, respectively, the main filter 12 are hermetically (air-tightly) sealed toward the exterior so that the risk of air leaks (introduction of external air) is excluded and a definite air-flow direction of the air to be cleaned is given according to arrow 9.

Figure 4:
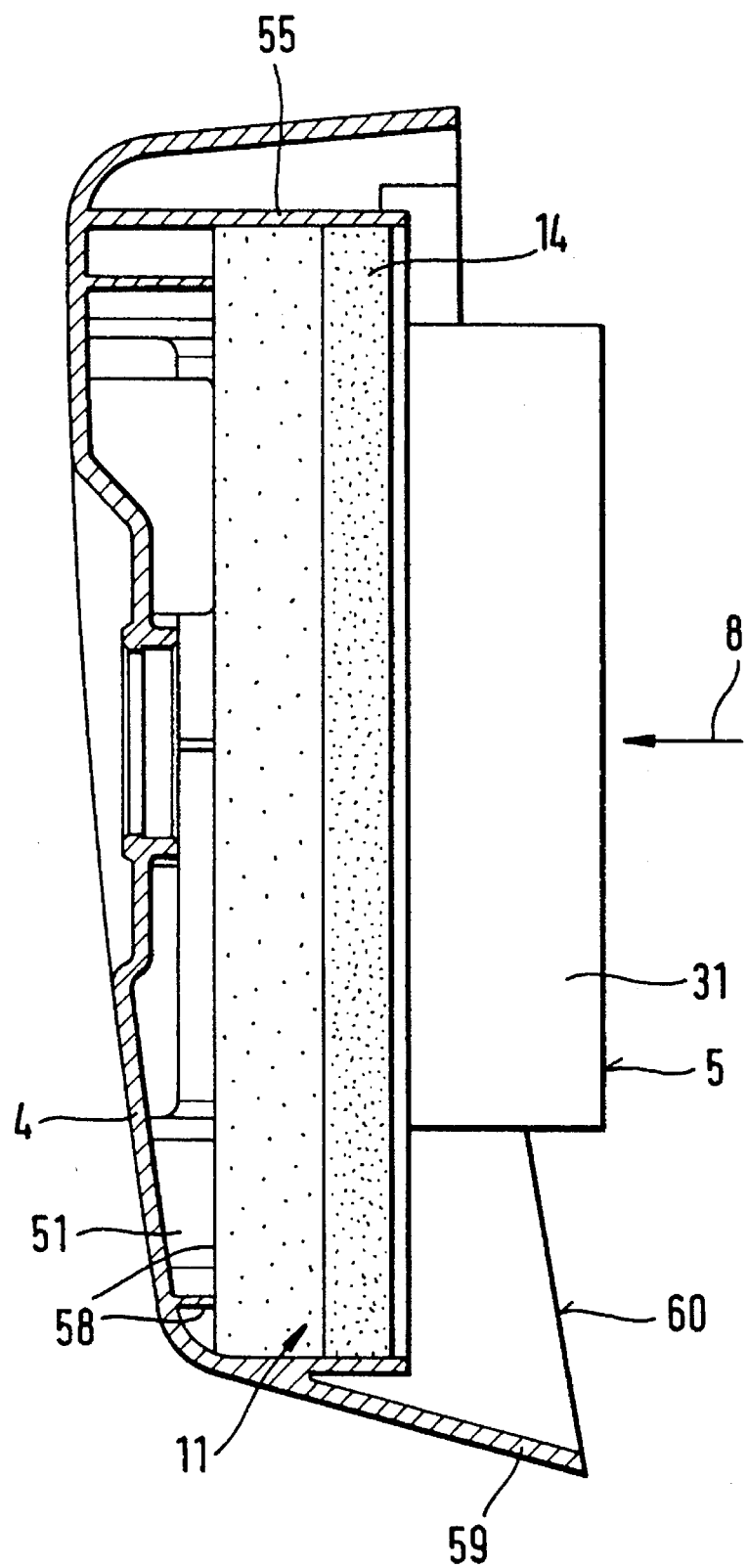
FIG. 4 a side view of the prefilter housing cover in a different embodiment.
Figure 5:
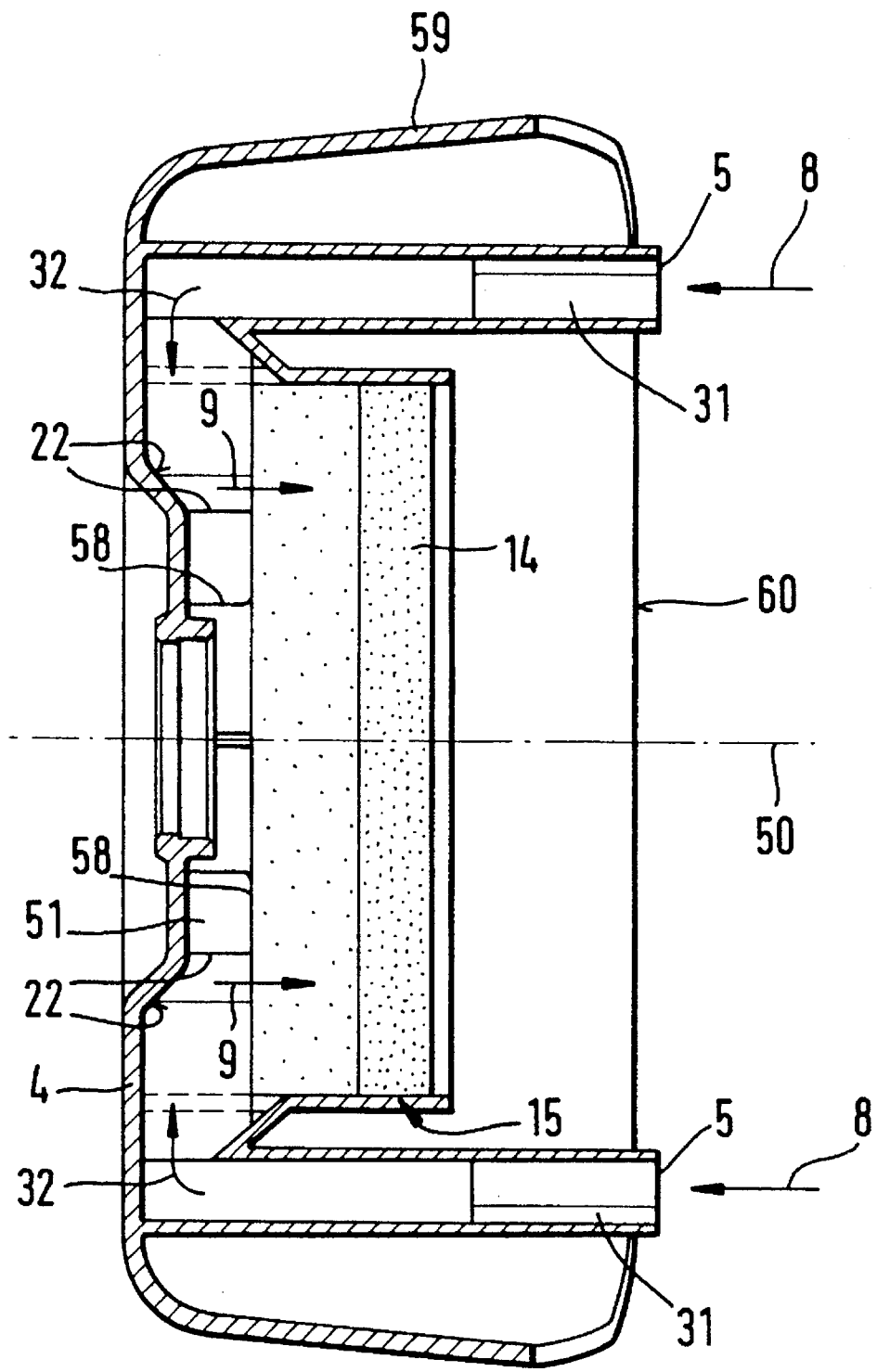
FIG. 5 a plan view of the housing cover according to FIG. 4.

FIGS. 4 and 5 illustrate a different embodiment of the housing cover 4 with the prefilter 11; the same reference numerals apply to the same structural members. In this embodiment, two air suction channels 31 are provided which are symmetrical relative to the longitudinal center axis 50 (FIG. 5). The air suction channels 31, extending across a major part of the structural height of the housing 4, are located at an angle of approximately 180° relative to the air-flow direction 9 with the inlet openings 5 being provided at that side of the housing cover 4 facing the main filter 12. The intake openings 5 are located when viewing the housing cover 4 in an end view within the periphery of the housing cover 4, wherein the lateral circumferential outer wall 59 surrounds the narrow sides as well as the longitudinal sides of the air suction channels 31. The air suction channels 31 project past the end face 60 of the outer wall 59 so that the inlet openings 5 are positioned outside of the outer housing cover wall under the cover 100 of the tool (FIG. 1). In the mounted position, the inlet openings 5 are located at the level of the housing wall 54 of the chamber housing 34 of the main filter 12.

The intake air 8 flows through the air suction channels 31 and is first deflected by 90 degrees at the interior surface of the housing cover 4 according to arrow 32 and subsequently hits rebound walls 22 which deflect the intake air toward the air flow direction 9 and forces it to flow through the filter body 14. Due to the double deflection of the intake air flow on its way through the suction channels 31 to the filter body 14, it is ensured that in particular large dirt particles which are being carried in the air flow lose their kinetic energy through the impact at the housing wall, respectively, at the rebound wall 22 so that the precipitate by their own weight and deposit at the bottom of the filter chamber 15, respectively, within the depositing spaces 51 of the housing cover 4.

In the embodiment according to FIGS. 4 and 5, the housing cover 4 is provided with a bore for attaching it to the chamber housing casing 34 of the main filter 12. A wing-screw 21 for connecting the housing cover and the casing of the main filter can be inserted into the bore. A bushing receiving the threaded bolt of the wing screw can be omitted so that the manufacture of such a housing cover is technologically very simple.

After flowing through the prefilter 11, the pre-cleaned air enters the main filter 12 which consists of the filter chamber 17 and the filter body 16 provided therein. The main filter chamber 17 is delimited toward the exterior by a cup-like chamber housing 34. In the air-flow direction 9, at the dirt side (upstream side) of the main filter, the housing wall 54 is provided with numerous air-flow openings 33 which are evenly distributed across the entire wall surface and through which air can flow into the filter chamber.

In the illustrated embodiment the main filter body 16 is a folded filter with numerous folded lamellas 25. As can be seen in FIG. 3, the folded lamellas 25 of the folded filter 16 are designed to be approximately vertical relative to the rest position of the tool and extend in the longitudinal direction of the air filter in air-flow direction 9. Thus, the folded lamellas 25 are arranged approximately at a plane 61 that is defined by the air-flow direction 9 and the vector 52 of the gravitational force, FIG. 2.

On flowing through the folded filter 16, dust and dirt particles of the air to be cleaned deposit within the spaces being formed by two adjacent folded lamellas 25. Due to the force of gravity, large dirt particles will precipitate from these spaces and collect at the bottom of the filter chamber, respectively, will gradually deposit from the bottom upwards within the spaces of the folded filters during an extended period of operation of the tool so that for a partial contamination of the main filter a sufficient filter surface for cleaning the air still remains, thereby also keeping the pressure difference low. Moreover, after unscrewing the housing cover 4 it can be visually determined by the level of dirt within the spaces whether the main filter has to be cleaned or exchanged. The visual control is performed from the outside through the air-flow openings 33 within the housing wall 54 without removing the chamber housing 34; due to their even distribution, the air-flow openings 33 allow a view of the entire filter surface of the filter body 16. In case that cleaning is necessary, the chamber housing 34 is removed and deposited dirt can easily be removed from the spaces of the folded filter and from the bottom of the filter chamber 17.

At the interior side of the chamber housing 34, a circumferential shoulder 57 is provided by which a step 63 is formed pointing in the direction of the upstream side of the main filter; the filter body 16 can be mounted air-tightly onto the step 63. For this purpose the filter body 16 is expediently provided at the upstream side with a circumferential sealing member 26 which is preferably manufactured of polyurethane foam and which provides a circumferential recess at the outer surface and rests on the shoulder 57.

The cup-shaped end housing 44 in which the filter chamber 19 and the filter body 18 of the fine filter are located, adjoins the chamber housing 34. The end housing 44 is provided with a circumferential support edge 29 that faces the main filter and onto which the fine filter 13 can be mounted. The filter body 18 of the fine filter is delimited by a circular, U-shaped sealing rim 27 which is designed as a sealing groove 28 and is expediently manufactured of a soft plastic material or of rubber. In the mounted position of the fine filter, the support edge 29 of the end housing 44 engages the sealing groove 28 air-tightly. This prevents air leaks between the downstream side and the upstream side of the fine filter. The sealing (foam) member 26 of the filter body 16 forms a support frame which encloses the sealing member 27 of the filter body 18 and by which the filter chamber 19 is sealed hermetically toward the exterior. In the direction of the air flow 9, the filter chamber 19 is thus delimited at the upstream side by the filter body 16 and at the downstream side by the cup-shaped end housing 44 which is provided with the outlet opening 6 at its free end. The exterior wall of the end housing 44 extends approximately parallel to the filter surface of the filter body 18 and overlaps the filter body 18 in the lower area with its support edge 29. Fine dirt particles having passed through the fine filter hit the exterior wall of the end-casing 44 and can deposit within the further depositing space 64 in the area of the bottom 56 of the end housing.

The filter body 18 advantageously consists of a flock-coated wire cloth and is able to filter finest particles from the air flow by means of electrostatic charging and by its fine-meshed structure.

As can be seen in FIG. 3, the main filter chamber housing 34 is attached to the end housing 44 of the fine filter 13 by screws 45. By the force of the screw connection, a sealing surface 46 extending circularly about the end casing 44 is pressed against the sealing member 26 of the filter body 16 such that the chamber housing 34 and the end housing 44 are connected air-tightly. The screw connection must only be unscrewed when maintenance of the main filter 12 is necessary. When the screw connection is unscrewed, the filter body 18 remains in its mounted position and thus protects the suction channel 7 from possible contaminations from the exterior. Advantageously, the screw connection is only accessible when the housing cover 4 of the prefilter 11 has been removed, in order to ensure that the chamber housing 34 will be unscrewed only after checking the contamination level of prefilter and main filter. It may also be advantageous to provide a quick acting closure or the like particularly easily accessible from the outside between main filter, chamber housing 34 and end housing 44.

A rebound container 30 is provided within the filter body 18 at the downstream side, approximately at the level of the outlet opening 6. The rebound container 30 is designed to catch fuel particles which may, when the intake channel is closed, be repulsed through the suction channel 7 by the piston of the combustion engine and which can lead to an inability of the fine filter to function when the filter body it wetted. The rebound container 30 is formed by a container plate 47 which is shaped convexly in the direction of the outlet opening 6 and which has approximately the same diameter as the outlet opening 6. At its circumference, the container plate 47 is surrounded by a container wall 48 which is designed to prevent a swirling of the repulsed flow of fuel particles and which guides the fuel particles into the rebound container 30. At its upper side, the container wall 48 has an open segment of an angular extension of approximately 60° so that even fuel particles being located above the rebound container precipitate downwardly. A pin 49 for facilitating removal of the filter body 18 from the filter chamber 19 is provided at the side of the filter body 18 opposite the rebound container.

Like the upstream side 20 of the prefilter 11, the upstream sides of main filter 12 and fine filter 13 are each positioned in a plane which extends downwardly, approximately vertically, when the tool is in its rest position so that large dirt particles can simply fall down from the surface of the filter body. This also ensures that the air to be cleaned flows through all three filters in a straight flow path without being diverted (air flow direction 9). Due to the uniform flow, the pressure drop within each filter segment and thus within the entire air filter is kept as low as possible. The particles carried by the air flow have a relatively uniform structure due to the deposition of large dirt particles at the rebound walls of the prefilter and at the upstream sides so that the filter bodies are evenly contaminated with dirt and dust. This increases the service life of the air filter.

The degree of cleanness of the air having passed through the fine filter 13 amounts to more that 99%. This clean air is guided as combustion air, via the end housing 44 which is tapered conically in the direction toward the outlet opening 6, to the suction channel 7 of the diaphragm carburetor in which the combustion air is mixed with fuel to form a fuel/air mixture.

At the clean air side of the fine filter 13 the end 44 can advantageously be provided with an opening through which a connecting tube can be inserted for pressure compensation between the dry surface of the regulating diaphragm of the diaphragm carburetor and the clean air side. An underpressure which builds up at the clean air side of the air filter when the contamination of the filter body increases, has a compensating effect on the regulating diaphragm so that he fuel supply is reduced according to the amount of in-flowing combustion air and the air/fuel ratio is kept substantially at a constant level.

The present invention is, of course, in no way restricted to the specific disclosure of the specification and drawings, but also encompasses any modifications within the scope of the appended claims.

What we claim is:

1. A suction air filter for an internal combustion engine of a hand-held working tool; said suction air filter comprising:

a housing having an inlet opening for air sucked in and an outlet opening for the clean air exiting the suction air filter and supplied as combustion air to a suction channel of the internal combustion engine;

said housing comprising a plurality of filter chambers arranged in series one after another in a direction of air flow from said inlet opening to said outlet opening;

wherein each one of said filter chambers has at least one filter body positioned therein through which filter body the air flows;

wherein said housing comprises at least a first, a second and a third one of said filter chambers, wherein said filter body of said first filter chamber is a prefilter, said filter body of said second filter chamber is a main filter, and said filter body of said third filter chamber is a fine filter;

wherein said housing comprises a detachable housing cover and wherein said first filter chamber is delimited by said housing cover and a housing wall of said second filter chamber; and wherein said housing wall of said second filter chamber has a circumferential sealing groove, said housing cover has a partition for delimiting said first filter chamber, and said circumferential groove receives an edge of said partition.

2. A suction air filter according to claim 1, wherein an upstream side of one of said filter bodies is substantially positioned in a plane extending perpendicular to said direction of air flow.

3. A suction air filter according to claim 1, wherein said filter chambers are connected to one another to as to be sealed against introduction of external air.

4. A suction air filter according to claim 3, wherein said filter chambers are detachably connected to one another.

5. A suction air filter according to claim 1, wherein said housing wall of said second filter chamber has a plurality of air-flow openings.

6. A suction air filter according to claim 5, wherein said air-flow openings are distributed uniformly over the entire surface area of said housing wall.

7. A suction air filter according to claim 1, wherein said second filter chamber comprises a cup-shaped chamber housing with an inner circumferential shoulder at which said filter body of said second filter chamber is supported in an air-tight manner.

8. A suction air filter according to claim 7, wherein said filter body of said second filter chamber comprises a sealing member made of a foamed plastic material, said sealing member resting air-tightly on said shoulder.

9. A suction air filter according to claim 8, wherein said sealing member is made of polyurethane.

10. A suction air filter according to claim 8, wherein said third filter chamber is comprised of a cup-shaped end housing with a circumferential support edge for receiving said filter body of said third filter chamber, said cup-shaped end housing having said outlet opening.

11. A suction air filter according to claim 10, wherein said filter body of said third filter chamber comprises a circumferential U-shaped sealing rim that engages said support edge in an air-tight manner.

12. A suction air filter according to claim 11, wherein said sealing rim is sealingly engaged by said sealing member of said filter body of said second filter chamber.

13. A suction air filter according to claim 10, wherein said filter body of said third filter chamber comprises a rebound container for rebounding fuel particles, arranged at a side of said filter body of said third filter chamber facing said outlet opening so as to be positioned opposite said outlet opening.

14. A suction air filter according to claim 10, wherein said cup-shaped end housing has a sealing surface facing said second filter chamber and wherein said sealing member rests sealingly on said sealing surface.

15. A suction air filter according to claim 10, wherein said cup-shaped chamber housing comprises fastening means for fastening said cup-shaped chamber housing to said cup-shaped end housing, wherein said fastening means are accessible only after removing said housing cover.

16. A suction air filter according to claim 1, wherein said housing cover has a air suction channel for guiding the air sucked in to said first filter chamber, said air suction channel having rebound walls for separating coarse dirt particles from the air flow.

17. A suction air filter according to claim 16, wherein said inlet opening is located, when viewing said housing cover in an end view, within the area enclosed by the periphery of said housing cover.

* * * * *